United States Patent
Gunti et al.

(10) Patent No.: US 10,592,669 B2
(45) Date of Patent: *Mar. 17, 2020

(54) SECURE BOOTING OF COMPUTER SYSTEM

(71) Applicant: VMware, Inc., Palo Alto, CA (US)

(72) Inventors: Mukund Gunti, Mountain View, CA (US); Timothy P. Mann, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 265 days.

This patent is subject to a terminal disclaimer.

(21) Appl. No.: 15/191,413

(22) Filed: Jun. 23, 2016

(65) Prior Publication Data

US 2017/0372074 A1 Dec. 28, 2017

(51) Int. Cl.
G06F 21/57 (2013.01)
H04L 9/32 (2006.01)
G06F 9/44 (2018.01)

(52) U.S. Cl.
CPC .............. G06F 21/575 (2013.01); G06F 9/44 (2013.01); H04L 9/3247 (2013.01)

(58) Field of Classification Search
CPC .................................. G06F 1/575; G06F 9/44
See application file for complete search history.

(56) References Cited

U.S. PATENT DOCUMENTS

| 7,373,520 B1 * | 5/2008 | Borthakur ......... G06F 17/30097 705/51 |
| 7,853,780 B2 | 12/2010 | Rotondo et al. |
| 8,099,718 B2 | 1/2012 | Nagabhushan et al. |
| 8,196,182 B2 | 6/2012 | Sussland et al. |
| 8,954,738 B2 | 2/2015 | Asokan et al. |
| 9,197,663 B1 | 11/2015 | Gilbert et al. |
| 9,229,741 B2 * | 1/2016 | Park ........................ G06F 9/445 |
| 2004/0054906 A1 | 3/2004 | Carro |
| 2004/0220975 A1 | 11/2004 | Carpentier et al. |
| 2006/0004662 A1 | 1/2006 | Nadalin et al. |
| 2006/0020710 A1 | 1/2006 | Rabenold et al. |

(Continued)

FOREIGN PATENT DOCUMENTS

GB        2500458 A   *   9/2013    ......... G06F 21/6218

OTHER PUBLICATIONS

File System, Wikipedia, published Jun. 22, 2015, https://en.wikipedia.org/w/index.php?title=File_system&oldid=668130490.*

(Continued)

*Primary Examiner* — Kim Huynh
*Assistant Examiner* — Kevin M Stewart
(74) *Attorney, Agent, or Firm* — Patterson + Sheridan, LLP

(57) ABSTRACT

A computer system is securely booted by executing a boot firmware to locate a boot loader and verify the boot loader using a first key that is associated with the boot firmware. Upon verifying the boot loader, computer system executes the boot loader to verify a system software kernel and a secure boot verifier using a second key that is associated with the boot loader. The secure boot verifier is then executed to verify the remaining executable software modules to be loaded during boot using a third key that is associated with the secure boot verifier. During boot, state data files of the computer system are mounted in a namespace that is isolated from the namespaces in which the executable software modules are mounted.

19 Claims, 5 Drawing Sheets

(56) References Cited

U.S. PATENT DOCUMENTS

| | | |
|---|---|---|
| 2007/0192611 A1 | 8/2007 | Datta et al. |
| 2012/0266223 A1 | 10/2012 | Yegin et al. |
| 2012/0272296 A1* | 10/2012 | Hodzic ................... G06F 21/51 726/4 |
| 2014/0013327 A1 | 1/2014 | Sherwood et al. |
| 2014/0143862 A1 | 5/2014 | Chaturvedi et al. |
| 2015/0143508 A1 | 5/2015 | Halibard |
| 2016/0087801 A1* | 3/2016 | Jones ................... H04L 9/3247 713/176 |
| 2016/0179554 A1 | 6/2016 | Khosravi et al. |
| 2017/0024224 A1* | 1/2017 | Bakke ................... G06F 9/4416 |
| 2017/0076087 A1 | 3/2017 | Hamlin et al. |
| 2017/0244704 A1 | 8/2017 | Brickell |
| 2017/0300207 A1 | 10/2017 | Wen et al. |

OTHER PUBLICATIONS

Microsoft Computer Dictionary, ftp://ftp.informatik.hu-berlin.de/pub/Mirrors/doc/o-reilly/9780735615137/cd_contents/Dictionary/ComD5.pdf, p. 211.*

Office Action dated Nov. 16, 2017 in related U.S. Appl. No. 15/191,405.

Office Action dated Jan. 12, 2018 in related U.S. Appl. No. 15/223,998.

* cited by examiner

SECURE BOOTING OF COMPUTER SYSTEM

CROSS-REFERENCE TO RELATED APPLICATION(S)

This application is related to U.S. patent application Ser. No. 15/191,405, , entitled "Secure Booting of Computer System" and filed Jun. 23, 2016 and to U.S. patent application Ser. No. 15/223,998, entitled "Secure Booting of Computer System" and filed Jul. 29, 2016.

BACKGROUND

Booting is a process of loading system software into main memory of a computer. Booting may be triggered by powering on the computer or by a soft restart that does not require power cycling of the computer. The process begins with the execution of boot firmware that performs a power-on self-test and is followed by loading and execution of the boot loader. In legacy systems, such as the ones implementing the BIOS (Basic Input/Output System) standard, the boot loader is executed without any verification that it can be trusted. Some systems may implement the UEFI (Unified Extensible Firmware Interface) standard, which has been developed to replace the BIOS standard. In such systems implementing the UEFI standard, "secure" booting may be enabled.

With secure booting enabled, the UEFI firmware checks that the boot loader is signed with the proper cryptographic key. Some Linux® based systems extend signature verification to the next stage of booting, i.e., when the Linux® kernel is loaded. Likewise, some Windows® based systems employ signature verification for its boot loader and also the Windows® kernel.

In virtualization platforms, such as computers installed with virtualization software, the virtualization software, also referred to as a hypervisor, is loaded into the main memory of the computer during the booting process. Some virtualization platforms implement a secure booting process enabled by the UEFI standard so as to provide customers of the virtualization platforms strong assurance that the hypervisor is secure and can be trusted. With secure booting enabled in such systems, the integrity of the boot loader and the hypervisor kernel is confirmed through signature verification.

DETAILED DESCRIPTION

Figure 1:
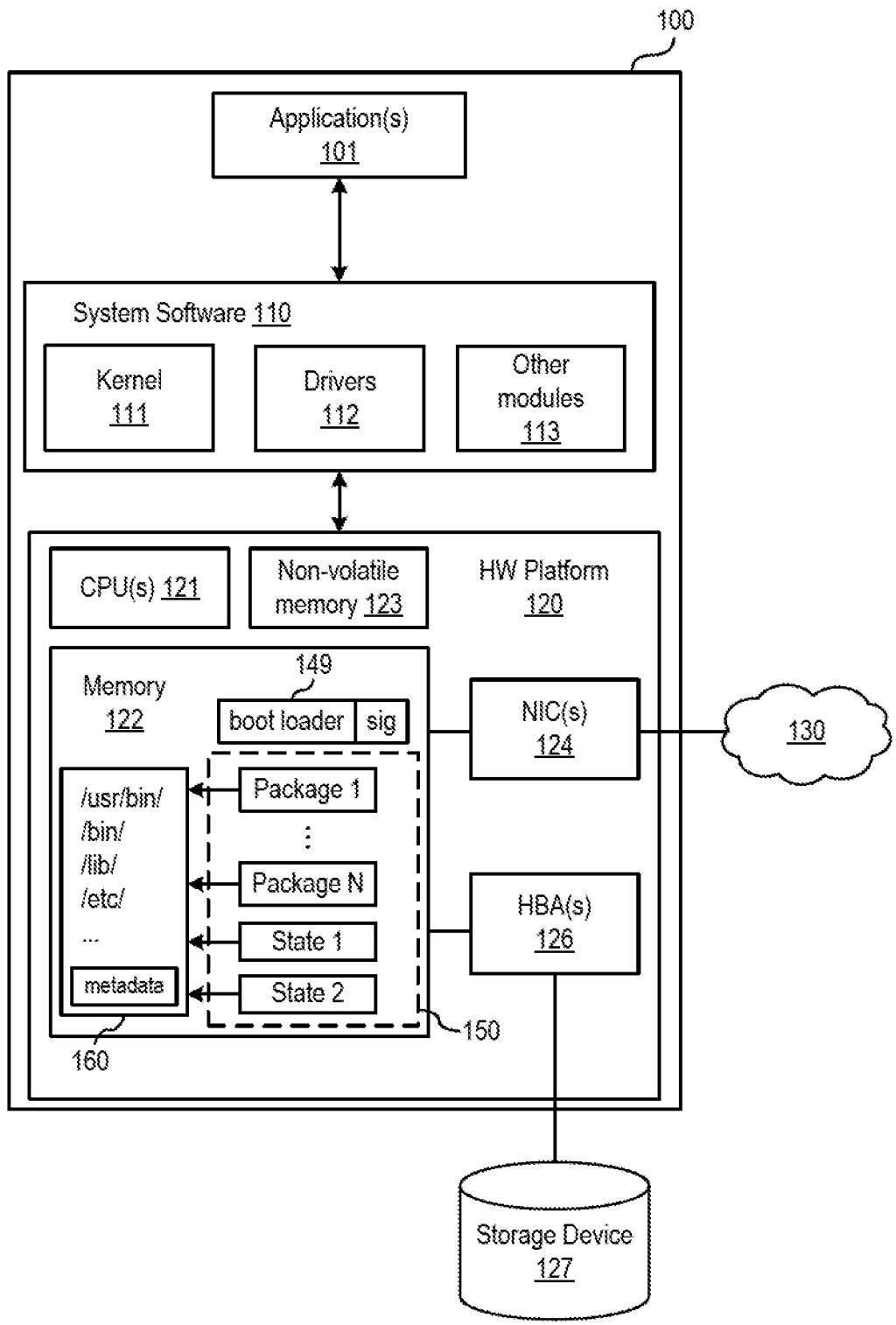
FIG. 1 is a block diagram of a computer system in which one or more embodiments may be implemented.

FIG. 1 is a block diagram of a computer system 100 in which one or more embodiments may be implemented. Computer system 100 shown in FIG. 1 is executing one or more applications 101 on top of system software 110. System software 110 includes a plurality of software layers including a kernel 111 that manages hardware resources provided by hardware platform 120 through various drivers 112 and other modules 113 that are loaded into memory upon boot. In one embodiment, system software 110 is an operating system (OS), such as operating systems that are commercially available. In another embodiment, system software 110 is a hypervisor that may be included as a component of VMware's vSphere® product, which is commercially available from VMware, Inc. of Palo Alto, Calif., that supports virtual machine applications running thereon. Hardware platform 120 includes one or more processing units (CPUs) 121, system memory 122 (e.g., dynamic random access memory (DRAM)), non-volatile memory 123 (e.g., read-only memory (ROM) or flash memory), one or more network interface cards (NICs) 124 that connect computer system 100 to a network 130, and one or more host bus adapters (HBAs) 126 that connect computer system 100 to a storage device 127. Storage device 127 represents a persistent storage device, which may be connected locally or through a storage area network (SAN).

Computer system 100 may be configured as a stateless machine in which case it would not have a connection to storage device 127. In such cases, booting of computer system 100 is carried out using a boot loader 149 and a boot image 150 that are retrieved from network 130 through NICs 124. In the embodiment illustrated in FIG. 1, booting of computer system is carried out using boot loader 149 and boot image 150 that are retrieved from storage device 127.

Figure 3:
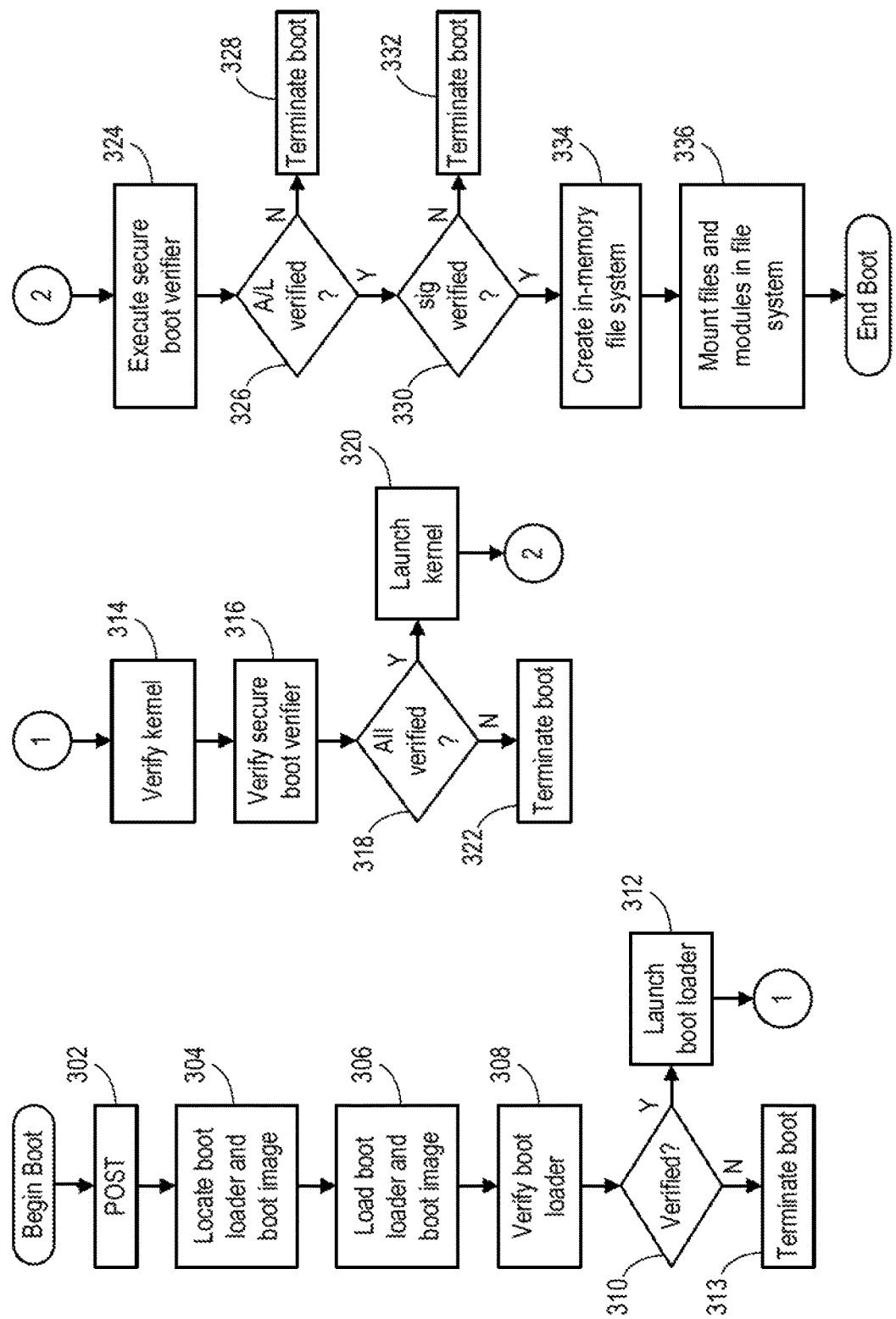
FIG. 3 is a flow diagram that illustrates a secure booting process according to an embodiment.

The process of securely booting computer system 100 is illustrated in a flow diagram shown in FIG. 3. Portions of FIG. 1, in particular contents of system memory 122, schematically depict the process of booting computer system 100. When computer system 100 is booted, e.g., when it is powered on or undergoes a soft restart, boot firmware stored in non-volatile memory 123 is executed. In one embodiment, boot firmware is UEFI (Unified Extensible Firmware Interface), which is a standard boot firmware for computers designed to replace BIOS, and the boot firmware has embedded therein certificates of trusted entities, e.g., UEFI certificate, and these certificates contain public keys of the trusted entities. As will be further described in conjunction with FIG. 3, the public key of a trusted entity will be used in verifying a boot loader, in particular a digital signature (shown as 'sig' in FIG. 1) that is appended to the boot loader (or otherwise made available to the boot firmware for retrieval and verification). If the boot loader cannot be verified, it will not be permitted to execute, such that the booting process will halt. On the other hand, if the boot loader can be verified, the boot loader executes to continue the secure booting process, which includes mounting executable code contained in Packages 1 to N, and state data contained in State 1 and State 2, in in-memory file system 160 (or other data structures local to computer system 100, e.g., file system on a local disk).

Figure 2:
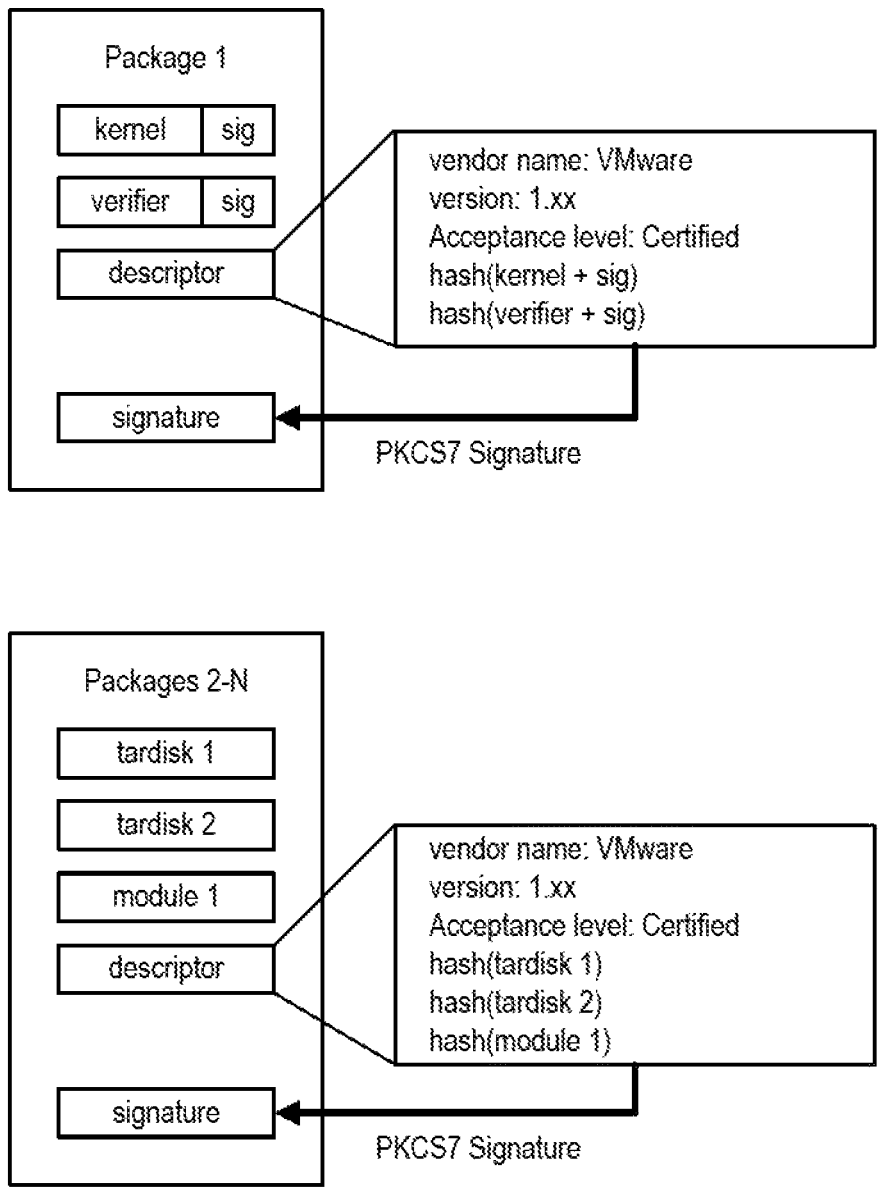
FIG. 2 is a schematic diagram that illustrates contents of different types of packages that are part of a boot image.

FIG. 2 is a schematic diagram that illustrates contents of different types of packages that are part of boot image 150. Package 1 is an encapsulation (i.e., a package) of early-load payloads including a system software kernel (referred to herein and shown in FIG. 2 as the "kernel") and a secure boot verifier utility (referred to herein and shown in FIG. 2 as the "verifier"). Each of the kernel and the verifier has a digital signature (sig) appended thereto. Package 1 also includes a descriptor that contains the package metadata including the vendor name, the version number, acceptance level (which will be described below), and hashes of each of the payloads. The descriptor is digitally signed by first hashing it and then encrypting the hashed result using a private key of the vendor, and the digital signature of the descriptor is stored within the package. Packages 2 to N are additional packages that are mounted during the boot process after the early-load package, and contain, for examples, drivers 112 and other modules 113 of system software 111. Each of Packages 2 to N contain blobs of data or "tardisks," which represent a collection of immutable files, one or more executable modules, a descriptor that contains the metadata of the package, and a digital signature of the descriptor.

FIG. 3 is a flow diagram that illustrates a booting process according to an embodiment. The booting process according to the embodiment is secure because it ensures integrity for all binaries that execute in computer system 100 during the booting process. The booting process is initially controlled by the boot firmware stored in non-volatile memory 123. As illustrated, the boot firmware at step 302 conducts a power-on self-test (POST), which checks the hardware devices of computer system 100 to ensure that they are in working order and properly initialized. At step 304, the boot firmware checks the boot configuration to locate boot loader 149 and boot image 150, and retrieves them from storage device 127 or through network 130 as explained above. At step 306, the boot firmware loads boot loader 149 and boot image 150 into system memory 122.

Boot loader 149 undergoes digital signature verification at step 308 before it is launched. As explained above, the boot firmware has embedded therein certificates of trusted entities, e.g., UEFI certificate, and the certificates contain public keys of the trusted entities. The public key of one of the trusted entities, e.g., the trusted entity associated or affiliated with the vendor of boot loader 149, will be used in verifying boot loader 149. As a first step in digital signature verification, the boot firmware decrypts the digital signature (sig) that is appended to boot loader 149 using the public key. Then, the boot firmware computes a hash of boot loader 149 (using the hash algorithm specified in the certificate of the public key) and compares the computed hash with the decrypted digital signature. If the two match (step 310), boot loader 149 is deemed verified and the boot firmware launches boot loader 149 at step 312. Otherwise, the booting process terminates prematurely at step 313. The embodiment described herein depicts one type of digital signature. However, it should be recognized that alternative embodiments may employ other types of digital signatures.

Boot loader 149 upon being launched performs digital signature verification on the kernel which is encapsulated in Package 1 of boot image 150 (step 314) and on the verifier which is also encapsulated in Package 1 of boot image 150 (step 316). The digital signature verification on the kernel and the verifier is carried out in the same manner as described above at step 308 for boot loader 149, except that a different public key is used (although in some other embodiments, the same key may be used in verifying steps 308, 314, and 316). Specifically, the public key of the creator of the kernel and the verifier, which is embedded in boot loader 149, is employed in the digital signature verification of the kernel and the verifier. The digital signatures of the kernel and the verifier are checked at step 318 and if both are verified, boot loader 149 launches the kernel at step 320. Otherwise, the booting process terminates prematurely at step 322.

At step 324, the kernel launches the verifier to perform acceptance level verification and digital signature verification on each of the packages that are part of boot image 150. According to embodiments, packages are created at different trust levels called acceptance levels, and a system administrator sets the minimum acceptance level a package must meet before it is allowed to be installed in computer system 100. The acceptance level verification at step 324 enforces this policy. Thus, in one embodiment, a package that is of a low (e.g., non-secure) acceptance level will not be verified if the system administrator sets the minimum acceptance level to be a high (e.g., secure) acceptance level.

Accordingly, at step 326, the verifier checks the acceptance levels of all the packages, Packages 1 to N, to confirm that the acceptance level of each of the packages is the same as or higher than the minimum acceptance level of computer system 100. If not, the booting process terminates prematurely at step 328. If the acceptance levels of all the packages are verified, the secure booting process continues on to step 330.

At step 330, the verifier performs digital signature verification on all of the packages using a public key embedded in the verifier. The public key embedded in the verifier may be the same or different from the public keys used in steps 308, 314, and 316. In particular, the verifier decrypts the digital signature of each package using the public key, computes a hash of the package's descriptor (using the hash algorithm specified in the certificate of the public key), and compares the computed hash with the decrypted digital signature. If the two fail to match for any one of the packages (step 330), the booting process terminates prematurely at step 332. On the other hand, if the two match for all of the packages, the secure booting process continues to step 334.

At step 334, the kernel creates an in-memory file system 160 with different namespaces in which the kernel at step 336 mounts the files and modules that are contained in all of the packages. During this step, the kernel examines the metadata of each file to see if a "sticky" bit (also referred to herein as "state data bit") of the file is set. The "sticky" bit is set for those files that contain state data. The "sticky" bit is not set for those files that do not contain state data. The initial setting of "sticky" bits of the files is part of the digital signature of the package that initially brings in the file, which gets verified at step 330. Hence, an arbitrary file in a package cannot be made to provide state by setting the "sticky" bit. If that happened, when the same package is loaded upon next reboot so that the arbitrary file will be treated as a state data file by the kernel, the booting process will terminate prematurely because the digital signature verification will fail at step 330.

Figure 4A:
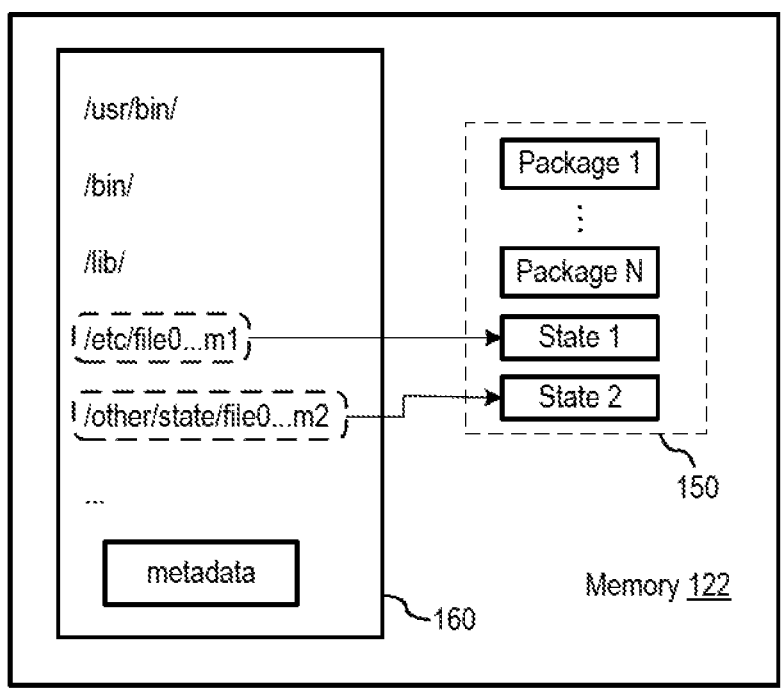
FIGS. 4A and 4B are schematic diagrams that illustrate processes for saving and restoring state data according to an embodiment.
Figure 4B:
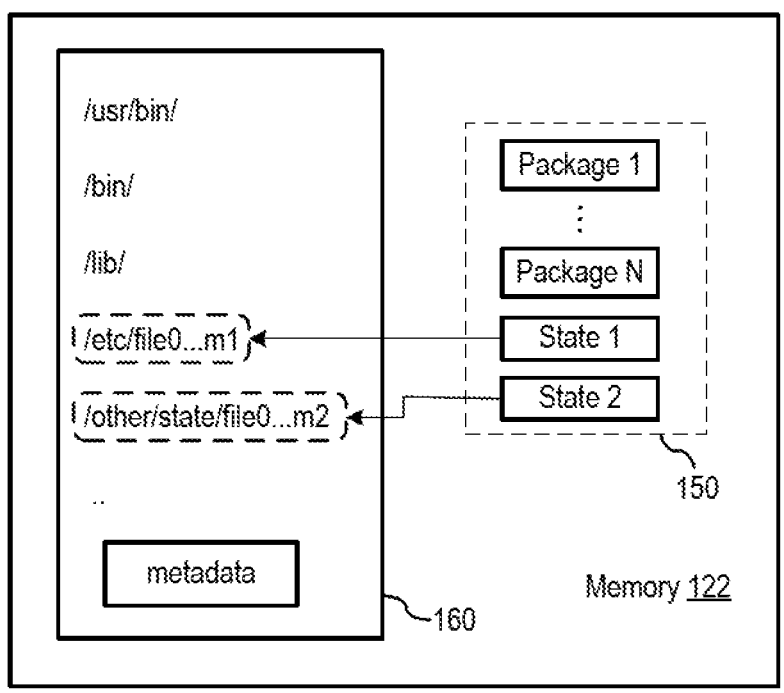

State data files, once recognized as such, are treated differently according to embodiments, because state data may change across boots. Instead of digitally signing the state data files after initial installation for subsequent secure reboots, embodiments employ a sandbox maintained by the kernel ("kernel sandbox") in which state data files are mounted at step 330. For verification during subsequent reboots, these state data files are collected into an archive file for state data and, upon rebooting, the state data files that have been collected into this archive file are remounted in the kernel sandbox. According to embodiments, the kernel sandbox is implemented as one or more predefined namespaces of in-memory file system 160 and each of these predefined namespaces is associated with a different archive file within a look-up table embedded in the kernel. In the particular examples given herein, the kernel sandboxes include the /etc/ namespace and the /other/state/ namespace as shown in FIGS. 4A and 4B, where the /etc/ namespace is associated with the state data archive file, State 1, and the /other/state/namespace is associated with the state data archive file, State 2. The arrows in FIG. 4A schematically depict the process for saving state data files in the /etc/ namespace into the archive file, State 1, and state data files in the /other/state/ namespace into the archive file, State 2. The arrows in FIG. 4B schematically depict the process for restoring the state data files into the /etc/ namespace from the archive file, State 1, and the state data files into the /other/state/namespace from the archive file, State 2.

Figures 5A, 5B:
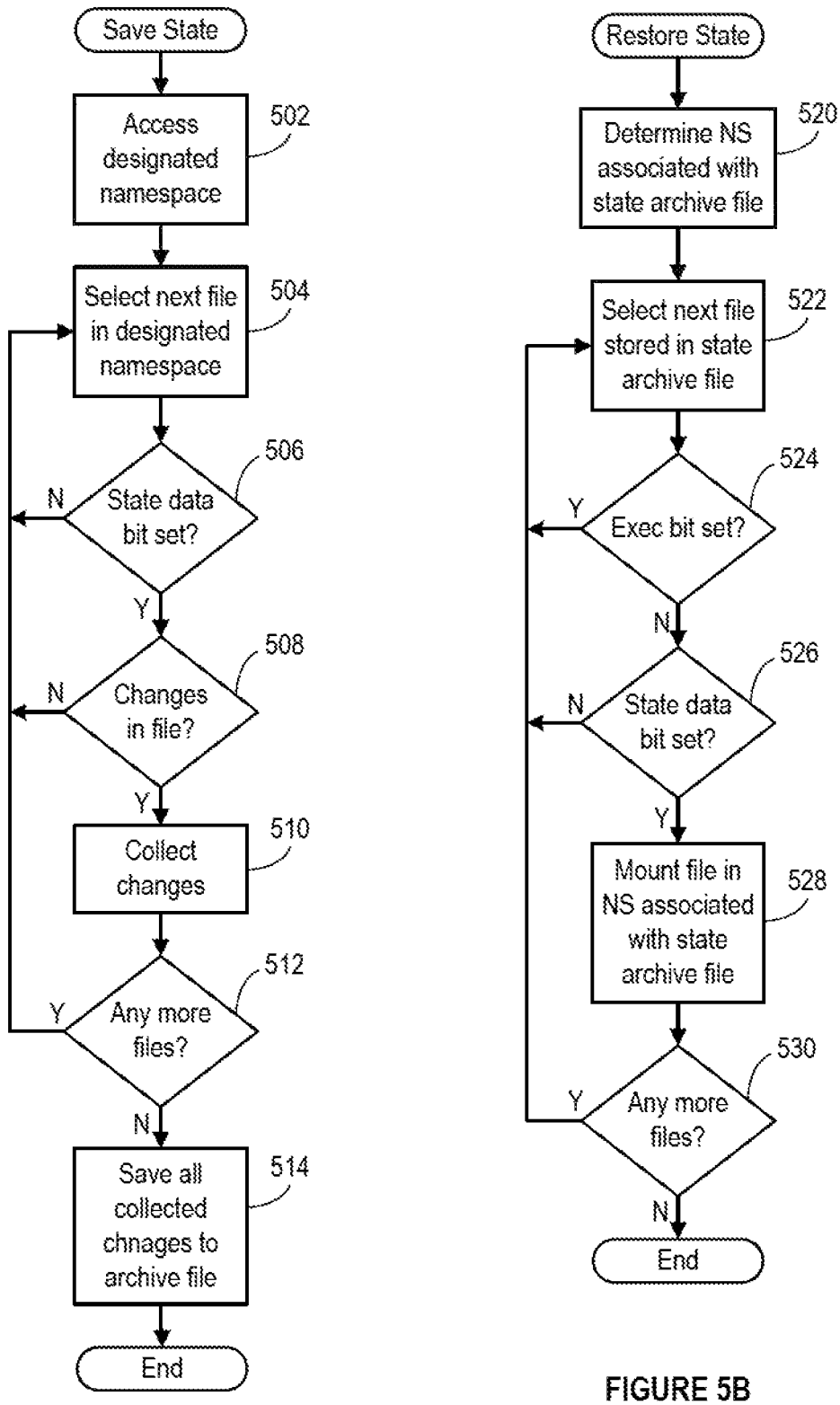
FIGS. 5A and 5B are flow diagrams that illustrate the processes for saving and restoring state data according to an embodiment.

FIGS. 5A and 5B are flow diagrams that illustrate the processes for saving and restoring state data according to an embodiment. The process for saving the state data shown in FIG. 5A is executed in a periodic manner by the kernel in the background. The process of restoring the state data shown in FIG. 5B is executed by the kernel as part of step 336 of the secure booting process shown in FIG. 3.

The process for saving the state data begins at step 502, where the kernel accesses a namespace that has been designated as a namespace for "sandboxing" state data files. Then, the kernel executes steps 504 through 512 for each file in the designated namespace. The kernel selects a file at step 504 and then, at step 506, examines the metadata of the file to see if a "sticky" bit (also referred to herein as "state data bit") of the selected file is set. With this arrangement, the namespace for "sandboxing" state data files may contain both state data files and other files such as executable files. Accordingly, in embodiments where the namespace for "sandboxing" state data files only includes state data files, the "sticky" bit need not be maintained for these state data files.

If the kernel determines at step 506 that the "sticky" bit is not set for the selected file, the flow returns to step 504 and the next file in the designated namespace is selected. If, on the other hand, the kernel determines at step 506 that the "sticky" bit is set for the selected file, the selected file is determined to be a state data file, updates to which need to be saved in the archive file associated with the designated namespace. Thus, the kernel at step 508 determines if the selected file has been changed and, if so, collects the changes to be saved at step 510 (for later saving at step 514). If the kernel at step 508 determines that the selected file has not been changed, the flow returns to step 504 and the next file in the designated namespace is selected.

At step 512, the kernel checks to see if there are any more files in the designated namespace. It so, the flow returns to step 504 and the next file in the designated namespace is selected. If not, the kernel at 514 issues a write operation to persist all of the changes collected at step 510 in the archive file associated with the designated namespace, e.g., in State 1 for the changes made to state data files in the /etc/ namespace and in State 2 for the changes made to state data files in the /other/state/ namespace.

The process for restoring the state data is executed at step 338 of FIG. 3 for each of the state archive files, e.g., State 1 and State 2. At step 520, the kernel examines the look-up table that associates state archive files with namespaces designated for "sandboxing" to determine the namespace into which the state data files stored in the state archive file is to be mounted. The kernel at step 522 selects a file stored in the state archive file and then, during execution of the decisions at steps 524 and 526, examines the metadata of the file to check the settings for two bits. The first bit is an "exec" bit, which would be set to indicate that the file is an executable file and the second bit is the "sticky" bit. If the "exec" bit is set or the "sticky" bit is not set, the flow returns to step 522 and the next file stored in the state archive file is selected. If the "exec" bit is not set and the "sticky" bit is set, the kernel at step 528 mounts the selected file in the namespace determined at step 520. At step 530, the kernel checks to see if there are any more files in the state archive file. It so, the flow returns to step 522 and the next file stored in the state archive file is selected. If not, the process terminates.

In one embodiment, any state that is associated with computer system 100 is stored in a configuration file and all such configuration files reside in the /etc/ namespace. In addition, the descriptor and the digital signature of each package are maintained as files in the /other/state/ namespace. In the corresponding metadata of these files, the "sticky" bits are set and the "exec" bits are not set.

In the embodiments described above, multiple public keys are embedded in the boot firmware. In alternative embodiments, only one public key is embedded in the boot firmware, and passed securely from one layer to the other. For example, there are no public keys embedded in the secure boot verifier utility, and the one public key embedded in the boot firmware is passed onto the secure boot verifier utility by the boot loader and the kernel at the time of launching the secure boot verifier utility.

In addition, the namespaces into which packages are mounted during the boot process are configured as an in-memory file system, in particular in-memory file system 160. In alternative embodiments, such a file system may be configured on-disk.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of securely booting a computer system, comprising:

executing a boot firmware to locate a boot loader and verify the boot loader using a first key that is associated with the boot firmware;

upon verifying the boot loader, executing the boot loader to verify a system software kernel and a secure boot verifier using a second key that is associated with the boot loader;

executing, by the boot loader, the system software kernel;

executing, by the system software kernel, the secure boot verifier to verify additional software modules using a third key that is associated with the secure boot verifier;

creating a file system including first namespaces in which one or more verified additional software modules are to be mounted, a second namespace identified by the system software kernel as a namespace designated for storing state data files, and a third namespace identified by the system software kernel as a namespace designated for storing state data files, wherein the state data files stored at the second namespace are configuration files;

further wherein the one or more verified additional software modules are contained within software packages, and wherein the third namespace includes a descriptor and a digital signature of each software package, wherein the descriptor includes a hash of at least a portion of the software package to which the descriptor pertains;

further wherein the state data files stored at the second namespace and the state data files stored at the third namespace each have (a) a first data bit indicating whether the file contains state data, and (b) a second data bit indicating whether the file is executable; and further wherein the state data files stored at the second namespace and the state data files stored at the third namespace each have (a) the first data bit set, and (b) the second data bit not set.

2. The method of claim 1, wherein the boot firmware is firmware that is persistently stored in the computer system and executes upon power-up or restart of the computer system, and the boot loader is a system software boot loader that is retrieved from a storage device or over a network.

3. The method of claim 2, wherein the system software boot loader is retrieved from the storage device or over the network along with a boot image that includes at least one state data archive file, each of which contains one or more of the state data files.

4. The method of claim 3, wherein the at least one state data archive file includes (a) a first archive file containing the state data files stored at the second namespace, and (b) a second archive file containing the state data files stored at the third namespace, the system software kernel associates (a) the state data files stored at the second namespace with (b) the second namespace using a look-up table embedded in the system software kernel, and the system software kernel associates (a) the state data files stored at the third namespace with (b) the third namespace using the look-up table;

further wherein the first archive file is of a previous boot of the computer system, and wherein the second archive files is of the previous boot of the computer system.

5. The method of claim 1, wherein the additional software modules are verified by verifying a digital signature of each of the software packages.

6. The method of claim 1, wherein the file system is an in-memory file system.

7. The method of claim 1, further comprising:

terminating the booting if any of the state data files are mounted in any of the first namespaces.

8. The method of claim 1, wherein the first and third keys are the same keys.

9. The method of claim 1, wherein each software package includes a set of payloads and the descriptor, wherein the descriptor includes a hash of each of the payloads, and a digital signature of each software package is generated using the descriptor thereof.

10. The method of claim 9, wherein the state data files include all of the configuration files.

11. The method of claim 9, wherein the state data files include the descriptors and the digital signatures of all of the software packages.

12. The method of claim 9, wherein each software package has an acceptance level associated therewith and the descriptor thereof further includes the acceptance level, and the software modules of a software package are verified by also verifying that the software package is at an acceptance level equal to or above an acceptance level of the computer system.

13. A non-transitory computer readable medium comprising instructions for causing a computer system to perform a booting process that includes the steps of:
    executing a boot firmware to locate a boot loader and verify the boot loader using a first key that is associated with the boot firmware;
    upon verifying the boot loader, executing the boot loader to verify a system software kernel and a secure boot verifier using a second key that is associated with the boot loader;
    executing, by the boot loader, the system software kernel;
    executing, by the system software kernel, the secure boot verifier to verify additional software modules using a third key that is associated with the secure boot verifier;
    creating a file system including first namespaces in which one or more verified additional software modules are to be mounted, a second namespace identified by the system software kernel as a namespace designated for storing state data files, and a third namespace identified by the system software kernel as a namespace designated for storing state data files, wherein the state data files stored at the second namespace are configuration files;
    further wherein the one or more verified additional software modules are contained within software packages, and wherein the third namespace includes a descriptor and a digital signature of each software package, wherein the descriptor includes a hash of at least a portion of the software package to which the descriptor pertains;
    further wherein the state data files stored at the second namespace and the state data files stored at the third namespace each have (a) a first data bit indicating whether the file contains state data, and (b) a second data bit indicating whether the file is executable; and
    further wherein the state data files stored at the second namespace and the state data files stored at the third namespace each have (a) the first data bit set, and (b) the second data bit not set.

14. The non-transitory computer readable medium of claim 13, wherein the boot firmware is firmware that is persistently stored in the computer system and executes upon power-up or restart of the computer system, and the boot loader is a system software boot loader that is retrieved from a storage device or over a network.

15. The non-transitory computer readable medium of claim 14, wherein the system software boot loader is retrieved from the storage device or over the network along with a boot image that includes at least one state data archive file, each of which contains one or more of the state data files.

16. The non-transitory computer readable medium of claim 15, wherein the at least one state data archive file includes (a) a first archive file containing the state data files stored at the second namespace, and (b) a second archive file containing the state data files stored at the third namespace, the system software kernel associates (a) the state data files stored at the second namespace with (b) the second namespace using a look-up table embedded in the system software kernel, and the system software kernel associates (a) the state data files stored at the third namespace with (b) the third namespace using the look-up table;
    further wherein the first archive file is of a previous boot of the computer system, and wherein the second archive files is of the previous boot of the computer system.

17. A computer system comprising a volatile memory, a non-volatile memory, and processor that executes a booting process that includes the steps of:
    executing a boot firmware to locate a boot loader and verify the boot loader using a first key that is associated with the boot firmware;
    upon verifying the boot loader, executing the boot loader to verify a system software kernel and a secure boot verifier using a second key that is associated with the boot loader;
    executing, by the boot loader, the system software kernel;
    executing, by the system software kernel, the secure boot verifier to verify additional software modules using a third key that is associated with the secure boot verifier;
    creating a file system including first namespaces in which one or more verified additional software modules are to be mounted, a second namespace identified by the system software kernel as a namespace designated for storing state data files, and a third namespace identified by the system software kernel as a namespace designated for storing state data files, wherein the state data files stored at the second namespace are configuration files;
    further wherein the one or more verified additional software modules are contained within software packages, and wherein the third namespace includes a descriptor and a digital signature of each software package, wherein the descriptor includes a hash of at least a portion of the software package to which the descriptor pertains;
    further wherein the state data files stored at the second namespace and the state data files stored at the third namespace each have (a) a first data bit indicating whether the file contains state data, and (b) a second data bit indicating whether the file is executable; and
    further wherein the state data files stored at the second namespace and the state data files stored at the third namespace each have (a) the first data bit set, and (b) the second data bit not set.

18. The computer system of claim 17, wherein the boot loader is retrieved from a storage device or over a network along with a boot image that includes at least one state data archive file, each of which contains one or more of the state data files.

19. The computer system of claim 18, wherein the at least one state data archive file includes (a) a first archive file containing the state data files stored at the second namespace, and (b) a second archive file containing the state data files stored at the third namespace, the system software kernel associates (a) the state data files stored at the second namespace with (b) the second namespace using a look-up table embedded in the system software kernel, and the system software kernel associates (a) the state data files stored at the third namespace with (b) the third namespace using the look-up table;

further wherein the first archive file is of a previous boot of the computer system, and wherein the second archive files is of the previous boot of the computer system.

* * * * *